(12) United States Patent
Dernehl

(10) Patent No.: US 6,304,060 B1
(45) Date of Patent: Oct. 16, 2001

(54) STATUS INDICATOR FOR BATTERY CHARGER

(76) Inventor: James U. Dernehl, 2507 Canyon Ridge Ct., Arlington, TX (US) 76006-4001

(*) Notice: Subject to any disclaimer, the term of this patent is extended or adjusted under 35 U.S.C. 154(b) by 0 days.

(21) Appl. No.: 09/507,634

(22) Filed: Feb. 22, 2000

(51) Int. Cl.[7] .............................. H02F 7/00; G08B 21/00
(52) U.S. Cl. ........................................... 320/132; 340/636
(58) Field of Search .............................. 320/132; 340/636

(56) References Cited

U.S. PATENT DOCUMENTS

| | | | |
|---|---|---|---|
| 3,873,979 | * | 3/1975 | Craford ........................... 340/815.45 |
| 4,389,609 | * | 6/1983 | Kawamura ........................... 340/636 |
| 5,028,859 | * | 7/1991 | Johnson et al. ....................... 320/125 |

FOREIGN PATENT DOCUMENTS

| | | | |
|---|---|---|---|
| 2537752 A | * | 6/1984 | (FR) . |
| 57-167690 A | * | 10/1982 | (JP) . |

* cited by examiner

Primary Examiner—Peter S. Wong
Assistant Examiner—Gregory J. Toatley, Jr.

(57) ABSTRACT

Apparatus for indicating multiple operating states of a battery charger is formed by first and second color light emitting circuits coupled to a control circuit and one of the output terminals of the battery charger with first and second sense terminals of the respective first and second color light emitting circuits coupled to the other one of the battery charger output terminals such that operating bias may be applied to the light emitting circuits. The light emitting elements of the first and second color light emitting circuits may be positioned to emit light through a common diffusing lens to provide a third color substantially distinct from the first and second colors.

20 Claims, 2 Drawing Sheets

STATUS INDICATOR FOR BATTERY CHARGER

BACKGROUND OF THE INVENTION

Battery chargers are well known in the art as are numerous methods of indicating the operating status of the battery charger when it is connected to a battery for recharging. Such indicators typically range from a simple lamp or a colored spot associated with an on/off switch to built-in current and volt meters or displays with accompanying warning lamps to indicate fault conditions. Heretofore, simpler kinds of indicators have been limited in function. Similarly, indicating systems capable of providing many kinds of status information are usually prohibitively expensive in a low cost battery charging instrument. Thus the need exists for a readout or indicating system capable of multiple indications from the simplest possible structure in order to minimize costs providing this feature.

SUMMARY OF THE INVENTION

In accordance with the present invention apparatus for indicating multiple operating states of a battery charger providing a charging voltage across a positive output and a negative output is provided. Such apparatus may comprise a first color LED circuit having a first sense terminal and a common terminal; a second color LED circuit having a second sense terminal and a common terminal coupled to the common terminal of said first color LED circuit; a control circuit having a common terminal coupled to the common terminals of the first and second color LED circuits and having first and second charger terminals coupled in series with one of the positive and negative output terminals of the battery charger; wherein the first and second sense terminals of the respective first and second color LED circuits are coupled to the other one of the positive and negative output leads such that the coupling of the first and second LED circuits is operable to apply operating bias to the LED circuits.

In the preferred embodiment the first color LED circuit emits substantially red light upon activation and the second color LED circuit emits substantially green light. The light-emitting elements of the first and second color LED circuits may be disposed to emit light through a common diffusing lens so that simultaneous activation provides an appearance of a third color substantially distinct from the first and second colors. Operating bias may be applied to the first and second color LED circuits separately or in combination, continuously or alternately. Other features and advantages of the invention will become more readily understood from the following detailed description taken in connection with the appended claims and attached drawing in which:

DESCRIPTION OF PREFERRED EMBODIMENTS

Figure 1:
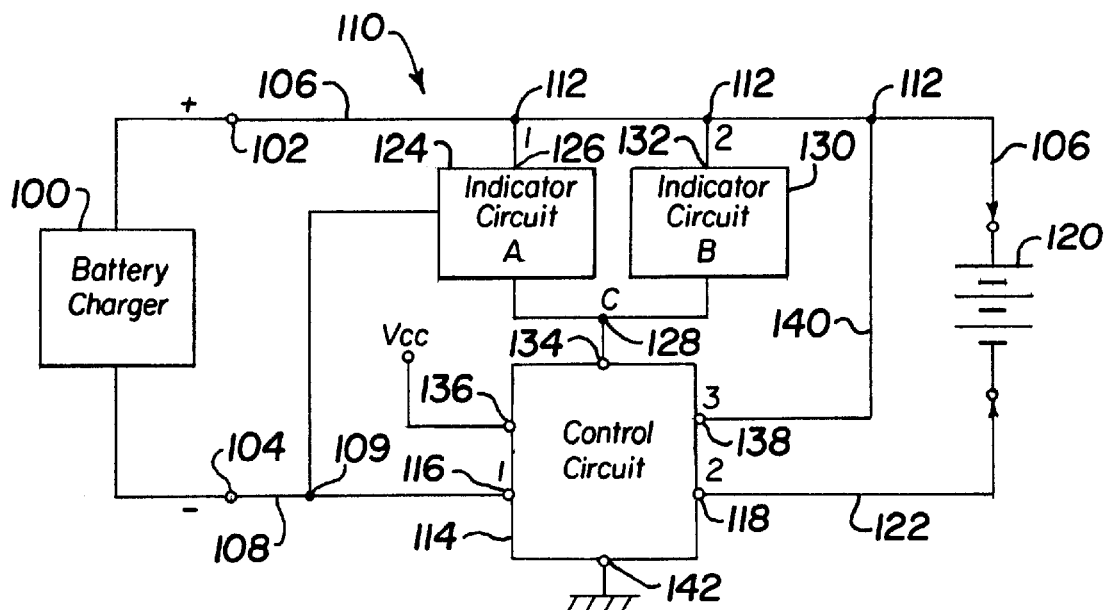
FIG. 1 is a block diagram illustrating a status indicator for a battery charger in accordance with the invention.

Throughout the several views of the drawing like numerals are used to indicate like parts. The drawing figures are not to scale but are intended to disclose the inventive concepts by illustration and are incorporated herein to illustrate presently preferred embodiments of the invention. The drawing should not be construed as limiting the invention to the illustrated and described embodiments.

FIG. 1 is a block diagram of a status indicator for a battery charger according to the present invention. Battery charger 100 is shown having a positive output terminal 102 and a negative output terminal 104. Coupled to output terminal 102 is an output lead 106 and coupled to output terminal 104 is an output lead 108. Output leads 106 and 108 provide for coupling to a status indicator 110 and further to a battery 120 to be charged by battery charger 100. Output lead 106 includes a node 112 for connection of certain portions of status indicator 110. A portion of status indicator 110 (a control circuit 114) is connected in series with the output lead 108 which connects to control circuit 114 at a first terminal 116 and continues from control circuit 114 at a second terminal 118 along output lead 122 to the negative terminal of the battery 120. Output lead 106 passes through node 112 and connects to the positive terminal of the battery 120.

An indicator circuit A 124 is coupled between node 112 and a common node 128. Node 112 is coupled to indicator circuit A by a first sense lead 126. Similarly, an indicator circuit B 130 is coupled between node 112 and common node 128 wherein the node 112 is coupled by a second sense lead 132 to indicator circuit B 130. The common node 128 is coupled to control circuit 114 at a common terminal 134. Operating voltage $V_{CC}$ for control circuit 114 is supplied along a lead to terminal 136 on control circuit 114. A third terminal 138 on control circuit 114 receives a sample of the battery voltage of the battery 120 from node 112 along path 140 coupled to the third terminal 138. Indicator circuit A 124 and indicator circuit B 130 may each include a light-emitting element and associated circuitry for controlling illumination of the light-emitting element in the respective indicator circuit.

In operation battery charger 100 provides a charging voltage across the positive output terminal 102 and the negative output terminal 104 to be applied for recharging battery 120. The status indicator 110 coupled in output leads 106 and 108 (including lead 122) responds to the voltage and current applied to or present in battery 120 to develop control signals for indicating the particular status of the battery charging operation.

Figure 2:
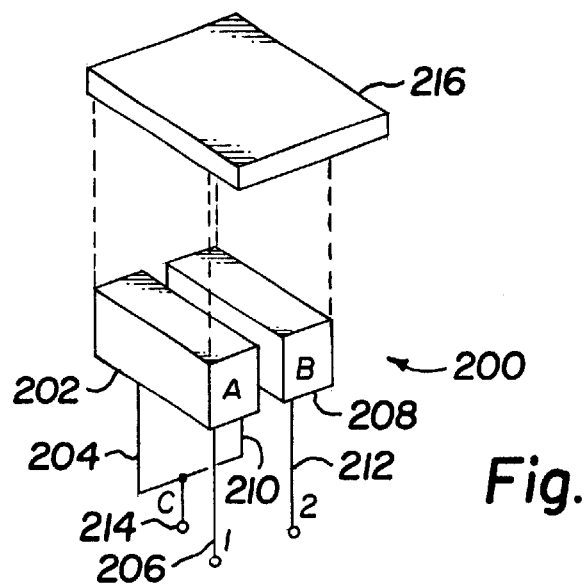
FIG. 2 is a pictorial drawing of indicating elements useable with the status indicator of the embodiment in FIG. 1.

FIG. 2 is a pictorial drawing of a pair of light-emitting elements assembled adjacent each other and placed in close proximity to a translucent diffusing lens. The visible element 200 includes light-emitting element A 202 having a common lead 204 and a first lead 206. Similarly, a light-emitting element B 208 includes a common lead 210 and a second lead 212. Common leads 204 and 210 are connected together at common terminal 214. Light-emitting elements 202 and 208 are placed in close proximity to each other and in close proximity to a translucent diffusing lens 216 which is typically placed on or very close to the light-emitting surfaces of the light-emitting elements 202 and 208. Thus, whenever either light-emitting element is caused to emit light, the respective light indicating signal is visible through translucent diffusing lens 216.

The translucent diffusing lens 216 acts to spread light emitted from the individual light-emitting elements 202 and/or 208. In one embodiment light-emitting element 202 may, for example, be configured to emit red light when it is activated. Similarly, light-emitting element 208 may be configured to emit, for example, green light. The human eye perceives each of these colors when illuminated individually as the respective color of the light being emitted which corresponds to the wavelength of light emitted by the light-emitting element 202 or 208. However, the perception of color by the human eye and brain is, at least in part, a subjective physiological and psychological response so that, in the case where the light-emitting elements 202 and 208 emit red light and green light respectively at the same time, the color perceived by the viewer will appear yellow. Thus, the structure illustrated in FIG. 2 permits the use of two light-emitting elements to be perceived as three different colors, depending upon the particular activation of the individual light-emitting elements 202 and 208. It will be further appreciated that numerous combinations of indications are possible among the three colors merely by varying the kind of signals applied to the light-emitting elements, e.g., continuous or intermittent, alternating or simultaneous, etc. Moreover, the light-emitting elements may be caused to flash in code for indicating data of various kinds.

Figure 3:
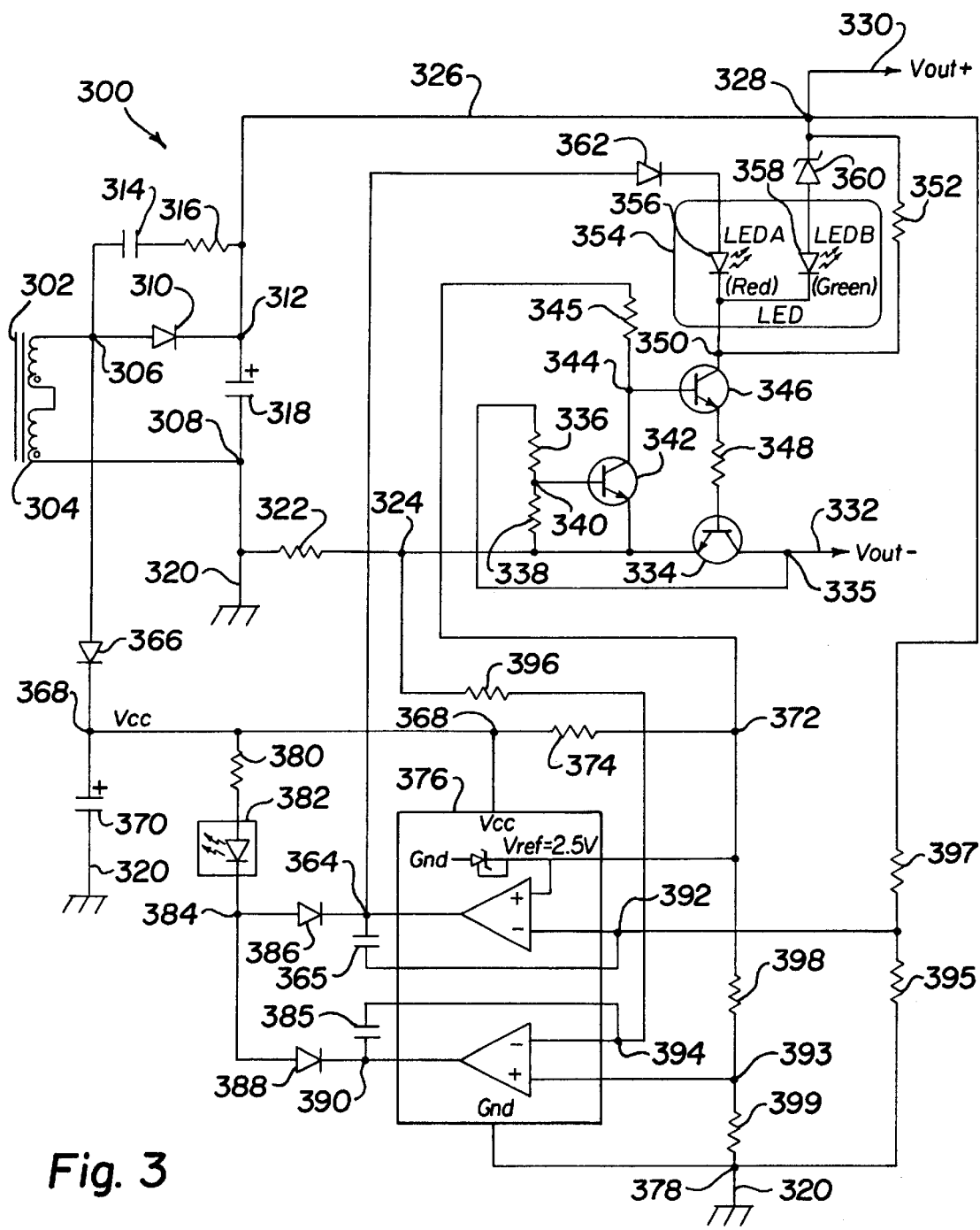
FIG. 3 is a schematic diagram of a portion of a battery charger containing an embodiment of the status indicator of the invention.

FIG. 3 is a schematic diagram of a portion of a battery charger which includes a circuit for operating the status indicating system of the present invention. The portion of the battery charger circuit illustrated in FIG. 3 includes the secondary side of the battery charging circuit 300, including the isolation transformer 302 having a secondary winding 304. One end of the secondary winding is coupled to node 306 and the other end of the secondary winding is coupled to node 308. Connected to node 306 is a rectifier 310 shown with its anode connected to node 306 and its cathode connected to a node 312. Also connected between node 306 and node 312 is the series combination of a capacitor 314 and a resistor 316. Node 312 is connected through an electrolytic capacitor 318 to node 308 which is coupled to earth ground 320. Also coupled to earth ground 320 at node 308 is a resistor 322, the other end of which is coupled to a node 324. Node 324 connects to the emitter of an NPN transistor which has its collector coupled to a node 334 to which is also connected the negative voltage output line 332 of the battery charger. Output line 332 (also labeled $V_{out}-$) corresponds to the output line 122 in FIG. 1 shown connected to the negative terminal of battery 120.

An output lead 326 is connected between node 312 and node 328 to which is also connected to a positive output lead 330 (also labeled $V_{out}+$) for connecting the battery charger output to a battery to be recharged. Node 335 mentioned previously as being connected to the collector of NPN transistor 334 is further coupled through resistor 336 to node 340 which, in turn, is coupled through resistor 338 to the emitter terminal of NPN transistor 334. Node 340 is also connected to the base of an NPN transistor 342 which has its emitter terminal connected to the emitter terminal of NPN transistor 334. The collector terminal of NPN transistor 342 is also connected to the base terminal of NPN transistor 346. The base terminal of NPN transistor 346 is connected to node 344 and therefrom through resistor 345 to node 372. The emitter terminal of NPN transistor 346 is coupled through resistor 348 to the base terminal of NPN transistor 334. The collector terminal of NPN transistor 346 is coupled to node 350 which is coupled through resistor 352 to node 328.

An indicator assembly 354 is shown which, in the illustrative embodiment of FIG. 3, includes a red light-emitting diode (LED) 356 and a green light-emitting diode (LED) 358. The cathodes of LED 356 and LED 358 are connected together internally to the indicator assembly and proceed along a common lead to node 350. The anode of the green LED 358 is connected to the anode of a zener diode 360 and the cathode of zener diode 360 is connected to node 328. The anode of red LED 356 is connected to the cathode of a rectifier 362 and the anode of rectifier 362 is connected to node 364. In operation the red LED 356 or the green LED 358 are individually or simultaneously activated, depending upon the relative voltages present at the respective anode and cathode terminals of the LED elements to be described hereinbelow.

Node 306 is also connected through a rectifier 366 to a node 368 which is coupled to earth ground 320 through an electrolytic capacitor 370. In the embodiment of FIG. 3, the anode of rectifier 366 is connected to node 306 and the cathode of rectifier 366 is connected to node 368. This particular connection of rectifier 366 and the capacitor 370 provides an operating voltage for a portion of the status indicating circuit 300. Node 368 is connected to the $V_{cc}$ terminal of a control circuit 376. The ground terminal of control circuit 376 is coupled to a node 378 which is connected to earth ground 320. Control circuit 376 typically contains two operational amplifiers for sensing various voltage levels in the battery charging output circuit and generating control signals used in the feedback system of the battery charging circuit and also in the status indicator circuit 300. A first operational amplifier (op amp) within control circuit 376 provides an output at node 364 which is connected to the cathode of a rectifier 386. The anode of the rectifier 386 is connected to a node 384 which, in turn, is connected to the cathode of the light-emitting diode within an optocoupler 382. When illuminated, optocoupler 382 is used to provide an isolated output signal coupled into the primary side of the battery charger circuit (not shown in FIG. 3). The anode of the light-emitting diode in optocoupler 382 is coupled to node 368 through resistor 380. The positive input of the first op amp in control circuit 376 is connected internally to a 2.5 volt reference relative to ground and the 2.5 volt reference is also connected externally of control circuit 376 to node 372. The negative input to the first op amp in control circuit 376 is coupled to node 392 which is, in turn, connected to the junction of resistor 395 and 397. Also coupled from node 392 is a capacitor which is connected to node 364. Resistor 397 is connected from node 392 to node 328 and resistor 395 is connected from node 392 to node 378. The positive input of a second op amp in control circuit 376 is connected to node 393. Node 393 is connected through resistor 398 to node 372 and node 393 is also connected through resistor 399 to node 378. The output of the second op amp in control circuit 376 is connected to a node 390 which, in turn, is connected to the cathode of a rectifier 388. The anode of rectifier 388 is connected to node 384. The node 390 is also coupled to node 394 at the negative input of the second op amp and control circuit 376 through a capacitor 385. Node 394 is also coupled through a resistor 396 to the node 324.

In operation the outputs of first and second op amps in control circuit 376 are in the quiescent state providing a high logic potential. The respective rectifiers, rectifier 386 connected to node 364 and rectifier 388 connected to node 390, are reversed biased when the outputs of the op amps in control circuit 376 are in a high logic state. The positive input of each of the first and second op amps in control circuit 376 is coupled to the internal 2.5 volt reference either directly in the case of the first op amp or through a resistive divider in the case of the positive input to the second op amp in control circuit 376. The signal input to the first op amp of control circuit 376 at node 392 is sensitive to the output voltage of the battery charger as divided by the combination of resistor 395 and resistor 397 so that when the output voltage of the battery charger, which is also the terminal voltage of the battery being recharged relative to the negative terminal of the battery, exceeds the 2.5 volt reference at the positive terminal of the first op amp of control circuit 376, then the op amp in control circuit 376 changes state and its output goes to a logic low which forces node 364 toward ground. This action forward biases rectifier 386 which is coupled between node 384 and 364 and causes the LED in optocoupler 382 to turn on and send a light pulse to the primary side of the battery charger circuit for the purpose of regulating the battery charger output voltage. Similarly, the second op amp in control circuit 376 is sensitive to the output current of the battery charger which is coupled to the negative input of the op amp through resistor 396 from node 324. Node 324 is coupled to the negative side of the secondary winding of isolation transformer 302 through resistor 322. The voltage across resistor 322 is proportional to the current supplied to the battery and this voltage at node 324 is sensed through resistor 396 to the negative terminal of the second op amp and control circuit 376. When the voltage at node 394 representing the battery charger output current exceeds the reference voltage present at the positive input terminal of the second op amp in control circuit 376, then the second op amp is caused to change states and its output goes to a logic low, forcing the voltage at node 390 to a low potential. This logic low present at node 390 thrusts forward bias rectifier 388 and supplies operating current to the light-emitting diode portion of optocoupler 382, again sending a light pulse to the primary side of the battery charging circuit to participate in the regulation of the battery charger output.

Attention is drawn to the three NPN transistors (transistor 334, transistor 342 and transistor 346) shown in FIG. 3. Operating voltages for this control circuit for the status indicator are supplied from several sources. The collector voltage for NPN transistor 342 at node 344 is supplied through resistor 345 from node 372 which is coupled to the 2.5 volt reference in control circuit 376. The collector voltage for transistor 346 is supplied through resistor 352 connected between the battery charger output at node 328 and node 350 at the collector of transistor 346. The control circuit consisting of these three transistors (334, 342 and 346) is thus connected so that the transistors have operating voltages present whenever the battery charger is providing output voltage to a battery being recharged. The bias current for causing transistors 346 and 334 to conduct originates at node 372 through resistor 345, the base emitter junction of transistor 346 and its emitter resistor 348, and then through the base emitter junction of transistor 334 and therealong to node 324 and through resistor 322 to the earth ground at node 320. Bias current for transistor 342 originates at the negative output terminal of the battery charger which is positive with respect to node 320 and there from node 334 flows through resistor 336 through the base emitter junction of transistor 342 to node 324. The operating state of each transistor in the control circuit just described depends on the voltage and current conditions present at the battery being charged which conditions will cause the respective light-emitting elements within the status indicating assembly 354 to illuminate individually or together or continuously or alternatively as will be described hereinbelow.

As in illustrative example of the operation of the embodiment shown in FIG. 3, the status indicator of the present disclosure is summarized in Table 1. The operating conditions are defined as:

Output voltage:
(a) 13.5 VDC@ D.V. mode, $I_L$=0A; or
(b) 7v~13 V @ C.C. mode, $I_L$≈1.25A;

Full load: 13 VDC @ 1.25 A typically; and

Power ON and charger output on V-I curve.

where C.V.=constant voltage; C.C.=constant current; and
$I_L$=load current (to battery being charged)

TABLE 1

| $V_{OUT}$ | $I_O$ | $Q_{342}$ | $Q_{346}$ | $Q_{334}$ | Red | Green | Yellow |
|---|---|---|---|---|---|---|---|
| 0 neg <3 V | >full load | ON | off | off | off | off | off |
| 3 V– | >full load | off | ON | ON | ON/off* | off | off |
| 7 V | >>full load | off | off | ON | | | |
| 7 V– 13 V | full load | ON | ON | ON | ON | off | off |
| 13 V– 13.5 V | <full load | off | ON | ON | ON | ON | ON |
| =13.5 V | full load | off | ON | ON | off | ON | off |
| >13.5 V | >>full load | ON | off | off | off | off/ON* | off |
| | >full load | off | ON | ON | off | | |

*blinks

It will be apparent from the foregoing that the principles of the invention may be used to form battery chargers with status indicators which employ the principles of the invention. It is to be understood that even though numerous characteristics and advantages of the invention have been set forth in the foregoing description together with details of the structure and function of the illustrated embodiments, this disclosure is to be considered illustrative only. Various changes and modifications may be made in detail, especially in matters of shape, size, arrangement and combination of parts, without departing from the spirit and scope of the invention as defined by the appended claims.

What is claimed is:

1. Apparatus for indicating multiple operating states of a battery charger providing a charging voltage across positive and negative output leads comprising:

(a) a dual-color indicator comprising:

(i) a first color light emitting circuit having a first sense terminal and a common terminal; and (ii) a second color light emitting circuit having a second sense terminal and a common terminal coupled to said common terminal of said first color light emitting circuit;

wherein the light emitting elements of said first and second color light emitting circuits are disposed in adjacent relationship to emit light through a common diffusing lens; and (b) a control circuit having a common terminal coupled to said common terminals of said first and second color light emitting circuits and having first and second charger terminals coupled in series with one of said positive and negative output leads of said battery charger;

wherein said first and second sense terminals of said respective first and second color light emitting circuits are coupled to the other one of said positive and negative output leads such that said coupling of said first and second light emitting circuits is operable to apply operating bias to said light emitting circuits.

2. Apparatus as defined in claim 1 wherein said light emitting elements of said first and second light emitting circuits, upon simultaneous activation, emit light through said common diffusing lens and provide an appearance of a third color substantially distinct from said first color and said second color.

3. Apparatus as defined in claim 1 wherein said control circuit is operable to allow activation of each said first and second light emitting circuits when the condition of said operating bias for each respective light emitting circuit is met.

4. Apparatus as defined in claim 3 wherein said activation is responsive to the level of voltage present across said positive and negative output leads.

5. Apparatus as defined in claim 3 wherein said activation is responsive to the level of current flowing between said first and second charger terminals in said one of said positive and negative output leads.

6. Apparatus as defined in claim 1 wherein said operating bias is applied to said first and second color light emitting circuits singly or in combination.

7. Apparatus as defined in claim 1 wherein said operating bias is applied to said first or second color LED circuit continuously or alternately.

8. A system for indicating multiple operating states of a battery charger:
 (a) a dual-color indicator comprising:
  (i) a first color light emitting circuit; and
  (ii) a second color light emitting circuit coupled to said first color light emitting circuit disposed in adjacent relationship to said first color light emitting circuit to emit light through a common diffusing lens; and
 (b) a control circuit coupled to said indicator wherein said control circuit is operable to apply operating bias to said light emitting circuits of said indicator to indicate multiple distinct states corresponding to predetermined threshold conditions.

9. The system of claim 8 wherein said control circuit controls said indicator to indicate:
 a first state wherein said first light emitting circuit is on and said second light emitting circuit is off;
 a second state wherein said first light emitting circuit is on and said second light emitting circuit is on; and
 a third state wherein said first light emitting circuit is off and said second light emitting circuit is on.

10. The system of claim 8 wherein said first, second and third states correspond to a substantially discharged battery, a charging battery, and a substantially charged battery.

11. The system of claim 8 further comprising a fourth state wherein said first light emitting circuit is blinking and said second light emitting circuit is off.

12. The system of claim 8 further comprising a fifth state wherein said first light emitting circuit is off and said second light emitting circuit is blinking.

13. The system of claim 8 further comprising a sixth state wherein said first light emitting circuit is off and said second light emitting circuit is off.

14. The system of claim 8 wherein the control circuit comprises transistors coupled to said first and second light emitting circuits and wherein the predetermined threshold conditions for the multiple distinct states may be modified by changing the bias point for the transistors.

15. The system of claim 8 wherein each state corresponds to a predetermined voltage or current level.

16. A system for indicating multiple operating states of a battery charger:
 (a) a dual-color indicator comprising:
  (ii) a first color light emitting circuit; and
  (ii) a second color light emitting circuit coupled to said first color light emitting circuit disposed in adjacent relationship to said first color light emitting circuit to emit light through a common diffusing lens; and
 (c) circuit means coupled to said indicator for controlling said light emitting circuits of said indicator to indicate multiple distinct states corresponding to predetermined threshold conditions.

17. The system of claim 8 wherein said circuit means controls said indicator to indicate:
 a first state wherein said first light emitting circuit is on and said second light emitting circuit is off;
 a second state wherein said first light emitting circuit is on and said second light emitting circuit is on;
 a third state wherein said first light emitting circuit is off and said second light emitting circuit is on;
 a fourth state wherein said first light emitting circuit is blinking and said second light emitting circuit is off; and
 a fifth state wherein said first light emitting circuit is off and said second light emitting circuit is blinking.

18. The system of claim 17 further comprising a sixth state wherein said first light emitting circuit is off and said second light emitting circuit is off.

19. The system of claim 16 wherein each state corresponds to a predetermined voltage or current level.

20. The system of claim 16 wherein the predetermined threshold conditions for the multiple distinct states may be modified by changing the bias point for transistors in the circuit means.

* * * * *

UNITED STATES PATENT AND TRADEMARK OFFICE
CERTIFICATE OF CORRECTION

PATENT NO. : 6,304,060 B1
DATED : October 16, 2001
INVENTOR(S) : Dernehl, James U.

It is certified that error appears in the above-identified patent and that said Letters Patent is hereby corrected as shown below:

Column 8,
Line 22, replace "8" with -- 16 --.

Signed and Sealed this

Eleventh Day of March, 2003

JAMES E. ROGAN
*Director of the United States Patent and Trademark Office*